United States Patent [19]

Beynon

[11] Patent Number: 4,986,672
[45] Date of Patent: Jan. 22, 1991

[54] RADIATION THERMOMETER

[75] Inventor: Thomas G. R. Beynon, Sheffield, United Kingdom

[73] Assignee: Land Infrared Limited, Sheffield, United Kingdom

[21] Appl. No.: 399,493

[22] PCT Filed: Mar. 18, 1988

[86] PCT No.: PCT/GB88/00208

§ 371 Date: Sep. 7, 1989

§ 102(e) Date: Sep. 7, 1989

[87] PCT Pub. No.: WO88/07248

PCT Pub. Date: Sep. 22, 1988

[30] Foreign Application Priority Data

Mar. 19, 1987 [GB] United Kingdom ............ 8706507

[51] Int. Cl.$^5$ .............................................. G01J 5/10
[52] U.S. Cl. .................................... 374/131; 374/128; 374/130; 374/133
[58] Field of Search ................ 374/130, 131, 133; 340/870.28, 870.29; 250/342; 455/612, 613

[56] References Cited

U.S. PATENT DOCUMENTS

| 3,940,987 | 3/1976 | Green et al. | 374/144 |
| 4,012,633 | 3/1977 | Huntley | 455/612 |
| 4,495,416 | 1/1985 | Mason et al. | 250/338 |
| 4,633,523 | 12/1986 | Witkover | 455/608 |

FOREIGN PATENT DOCUMENTS 2119925 11/1983 United Kingdom .

OTHER PUBLICATIONS

"An Optically Linked Telemetry System for Use with Electromagnetic Field Measurement Probes" Bassen et al., *IEEE Transactions on Electromagnetic Compatibility*, vol. EMC 20, No. 4, Nov. 1978, pp. 483–488, (340/870.29).

"A Device for the Remote Sensing of Temperature of High Voltage Transmission Collott, Conductor", *IEEE Transactions on Industrial Electronics and Control Instrumentation*, vol. IECI-28, No. 2, May 1981, pp. 116–119.

Primary Examiner—Thomas B. Will
Assistant Examiner—W. Morris Worth
Attorney, Agent, or Firm—Finnegan, Henderson, Farabow, Garrett & Dunner

[57] ABSTRACT

A radiation thermometer comprises a housing (1) within which is mounted a radiation detector system including a radiation sensor (2) positioned to receive radiation through a window (5) in the housing. The radiation detector system generates an electrical signal related to the sensed radiation. An optical signal generator (11, 14) is responsive to the electrical signal from the radiation detector system (9) and an internal housing temperature detector to generate a modulated optical signal whose frequency is related to the electrical signal from the radiation sensor and whose mark-space ratio is related to the signal from the internal temperature detector. The housing (1) is connectable with an optical waveguide, such as an optical fibre (16), into which the optical signal is coupled in use. A power source (13) is mounted within the housing (1) and is connected to the detector system (9).

5 Claims, 4 Drawing Sheets

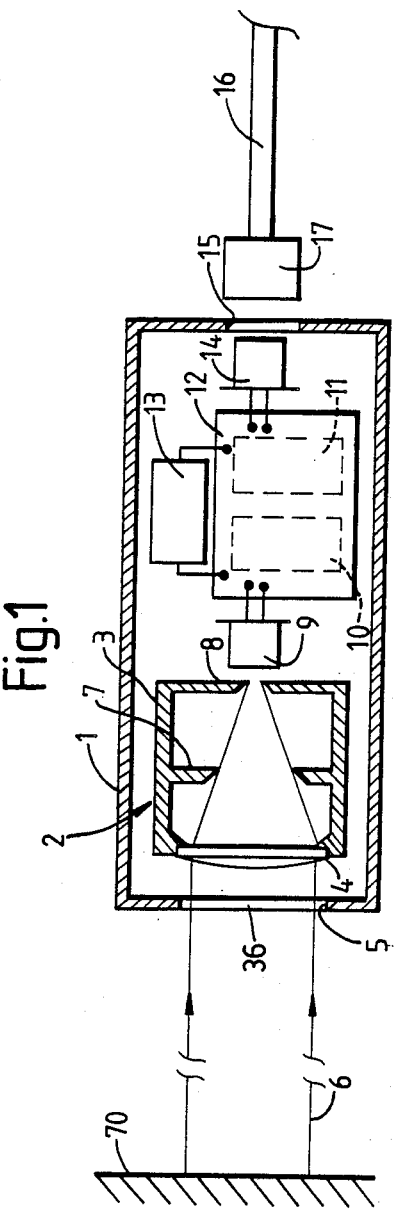
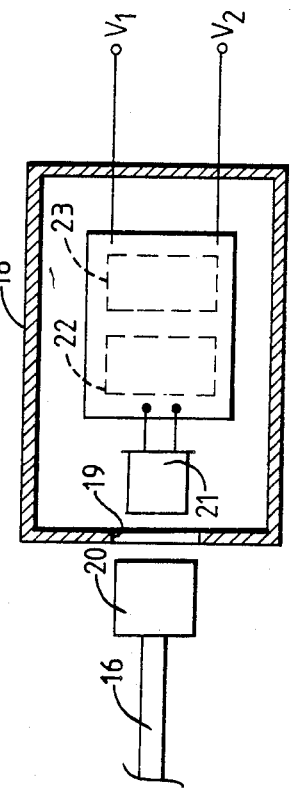
Fig.1
Fig.2

Fig.4A
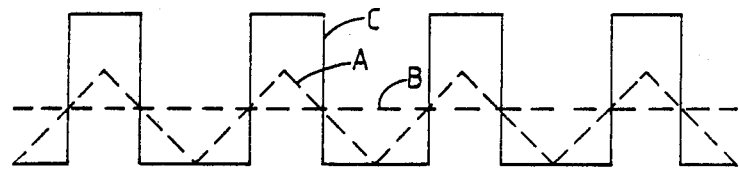
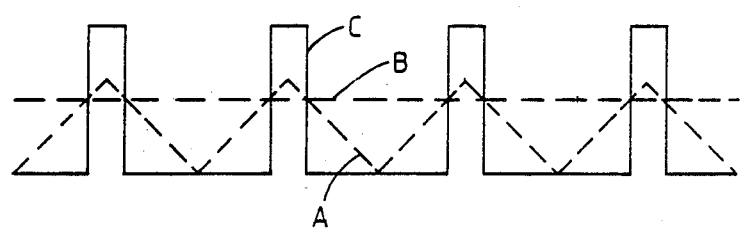
Fig.4B
Fig.5
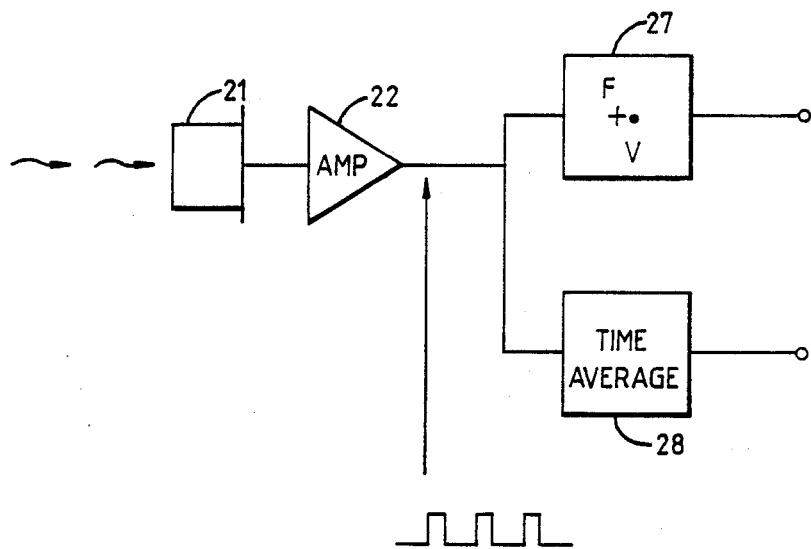

RADIATION THERMOMETER

The invention relates to a radiation thermometer.

Radiation thermometers typically include a radiation sensor which generates in response to incident radiation an electrical signal in the form of a voltage or current which passed to a remote detector which in turn generates a signal representative of the temperature of the object from which the radiation has been emitted. The sensor is powered from a remote source. One of the problems with these radiation thermometers is the fact that the electrical signal is subject to "pick-up" and earthing problems and thus can be modified before it reaches the detector. Moreover, electrical connections are difficult to reconcile with regulations applied to "inflammable atmosphere" areas, in which radiation thermometers may be used.

In accordance with the present invention, a radiation thermometer comprises a housing within which are mounted a radiation detector system including a radiation sensor positioned to receive radiation through a window in the housing, the system generating an electrical signal related to the sensed radiation an optical signal generator responsive to the electrical signal from the radiation detector system, an internal temperature detector for generating a signal related to the temperature of the thermometer, wherein the optical signal generator generates an optical signal whose frequency is related to the signal from the radiation sensor and whose mark-space ratio is related to the signal from the internal temperature detector, and wherein the housing is connectable with an optical waveguide into which the optical signal is coupled in use, and a power source connected to the detector system to constitute the sole source of power to the detector system.

This thermometer deals in a particularly simple manner with the problems mentioned above by providing all the electrical equipment, including the power source, within a single housing and without any electrical connections outside the housing. This avoids the pick up and earthing problems mentioned above since the signal passed to the remote detector will be optical.

Furthermore, the invention also permits the thermometer to be used in inflammable atmosphere areas. This can be achieved by selecting low-power consumption components together with a conventional long-life battery constituting the power source which will allow continuous operation for several years. In addition, or alternatively, the housing could be sealed. In this context, by "sealed" we mean that air or gases do not enter the housing.

The radiation sensor is preferably an infrared sensor such as a silicon photo-diode, germanium photodiode, or thermopile.

Conveniently, the detector system further comprises an amplifier to which signals from the radiation sensor are fed for amplification prior to being fed to the optical signal generator.

The optical signal generator conveniently comprises a light emitting diode.

In order to generate the modulated optical signal, the optical signal generator may comprise a modulating system for imposing a frequency modulation on the optical signal generated by the optical signal generator. For example, where the radiation sensor generates a voltage output signal, the optical signal generator may include a voltage to frequency converter. In other examples, the optical signal generator may be arranged to modulate the optical signal with a frequency related to the square root of the received voltage signal.

Typically, the radiation sensor will generate a voltage signal proportional to radiance of a target In theory, this could be used directly in a receiver to determine target temperature. However, the voltage signal could be modified due to the temperature of the thermometer itself and so to deal with this the thermometer includes the internal temperature detector.

Conveniently, the internal temperature detector comprises a thermistor bridge.

Preferably, the optical signal generator includes a comparator to respective input ports of which the signals from the radiation sensor and internal temperature detector are fed.

Conveniently, the housing comprises a radiation transparent window in alignment with the radiation sensor to enable radiation to pass into the housing and impinge on the sensor. In addition, a lens, mirror assembly, or collimating aperture may be provided to guide incoming radiation onto the sensor.

Typically, the housing will further comprise means for enabling an optical waveguide, such as an optical fibre, to be coupled with the housing in alignment with the optical signal generator. Conveniently, the optical waveguide will be detachable from the thermometer.

Typically, the other end of an optical waveguide which is connected to the thermometer will be connected to conventional circuitry incorporating a silicon photodiode to detect the incoming optical signal and for example a frequency to voltage converter to recover the coded information. This information could then be fed to a conventional signal processor/display/control unit in order to display the sensed temperature.

An example of a radiation thermometer in accordance with the present invention will now be described with reference to the accompanying drawings, in which:

FIG. 1 is a schematic block diagram of the thermometer;

FIG. 2 is a schematic block diagram of a receiver connected to the thermometer of FIG. 1;

FIGS. 4A and 4B illustrate output signals from the signal coder for two different thermometer temperatures;

FIG. 5 is a block circuit diagram of the receiver shown in FIG. 2; and,

Figure 3:
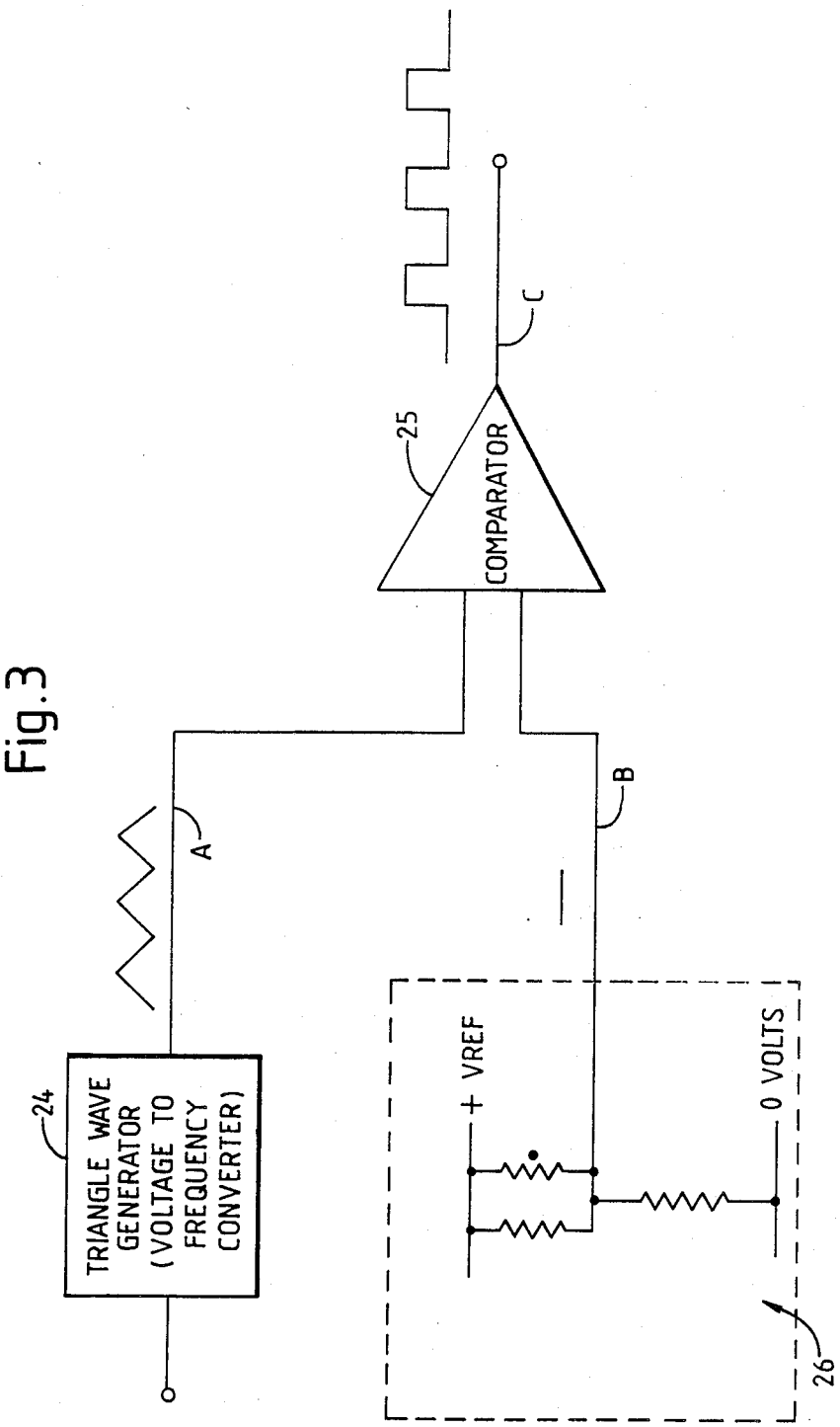
FIG. 3 is a block circuit diagram illustrating the signal coder of FIG. 1.

The radiation thermometer shown in FIG. 1 comprises a cylindrical housing 1 within which is mounted an infra-red radiation collection assembly 2. The collection assembly 2 comprises a housing 3 supporting a lens 4 in alignment with an entrance aperture 5 of the housing 1. Infrared radiation 6 from a target 70 passes through the aperture 5 and impinges on the lens 4 which focusses the radiation through a glare stop 7 onto a field stop 8. A glass window 36 is positioned in the aperture 5 of the housing 1 to seal the aperture 5 against the passage of gas or air into the housing 1. The collection assembly 2 may also include a filter (not shown) to limit spectral bandpass.

An infrared detector 9 such as a thermopile, silicon photodiode, germanium photodiode, or indium gallium arsenide photodiode is positioned downstream of the field stop 8 to receive the focussed radiation. The detector generates, in a conventional manner, a voltage signal whose magnitude is proportional to the target radiance.

This voltage signal is fed to a signal amplifier 10 which boosts the detector signal, the amplified signal being fed to a signal coder circuit 11. The amplifier and coder circuits 10, 11 are provided on a printed circuit board 12 mounted within the housing 1. The components on the board 12 are powered by a long-life battery 13. The signal coder 11 codes the signal in a manner to be described below and applies the resulting coded signal to a light emitting diode 14 aligned with an outlet aperture 15 of the housing 1. The LED 14 generates an optical signal modulated in accordance with the drive signal from the coder circuit 11, the optical signal being coupled into an optical fibre 16 supported in the aperture 15 by a coupling member 17 sealed, in use, within the aperture.

The optical fibre 16 extends from the thermometer to a remote receiver shown in FIG. 2. The receiver comprises a housing 18 having an aperture 19 in which a coupling member 20 is mounted in use, the coupling member 20 supporting the remote end of the optical fibre 16. A silicon photodiode 21 is mounted in the housing 18 in alignment with the aperture 19 and in conjunction with a transimpedance amplifier 22 converts the incoming optical signal back into a voltage signal. A signal decoder 23 recovers from the voltage signal two output signals corresponding to the apparent target radiance ($V_1$) and the thermometer internal temperture ($V_2$) respectively. The generation and processing of these signals will be described in more detail below.

The signal coder circuit 11 is shown in more detail in FIG. 3 and comprises a voltage to frequency converter circuit 24 to which the amplified detector signal is fed. This circuit generates a triangular voltage waveform (A) whose frequency is proportional to the input signal magnitude. This triangular waveform is fed to one input of a comparator 25. A thermistor bridge circuit 26 is also provided in the signal coder 11 and generates a voltage level which is an analogue of the thermometer internal temperature (B). This, substantially DC level, is fed to the other input of the comparator 25.

The comparator 25 compares the signal from the voltage frequency converter 24 with the voltage level from the thermistor bridge circuit 26 and the output signal (C) from the comparator 25 swings high or low depending on which of the signals is the larger. Thus, the output signal from the comparator 25 is a train of square pulses whose frequency is the same as the signal from the voltage to frequency converter 24 and whose mark-space ratio is proportional to the signal from the thermistor bridge circuit 26.

Two examples of the signals are shown in FIG. 4A. In each case the signal A from the voltage to frequency converter 24 is the same while in FIG. 4A the voltage signal from the thermistor bridge circuit 26 is relatively low compared with the signal shown in FIG. 4B. It will be seen therefore that the signal C generated in the FIG. 4A example has a different mark-space ratio from that generated in the FIG. 4B example.

The receiver is shown in more detail in FIG. 5 where it will be seen that the decoder 23 comprises a frequency to voltage converter circuit 27 and a time averaging circuit 28. The incoming optical signal is detected by the silicon photodiode 21 and converted to a voltage signal which is amplified by the amplifier 22 and is then fed in parallel to the frequency to voltage circuit 27 and the time averaging circuit 28. The output signal from the frequency to voltage circuit 27 is a voltage related to the frequency of the incoming optical signal and hence to the original target radiance while the signal output from the time averaging circuit 28 is related to the mark-space ratio of the incoming signal and hence to the original thermistor bridge circuit signal.

Figure 6:
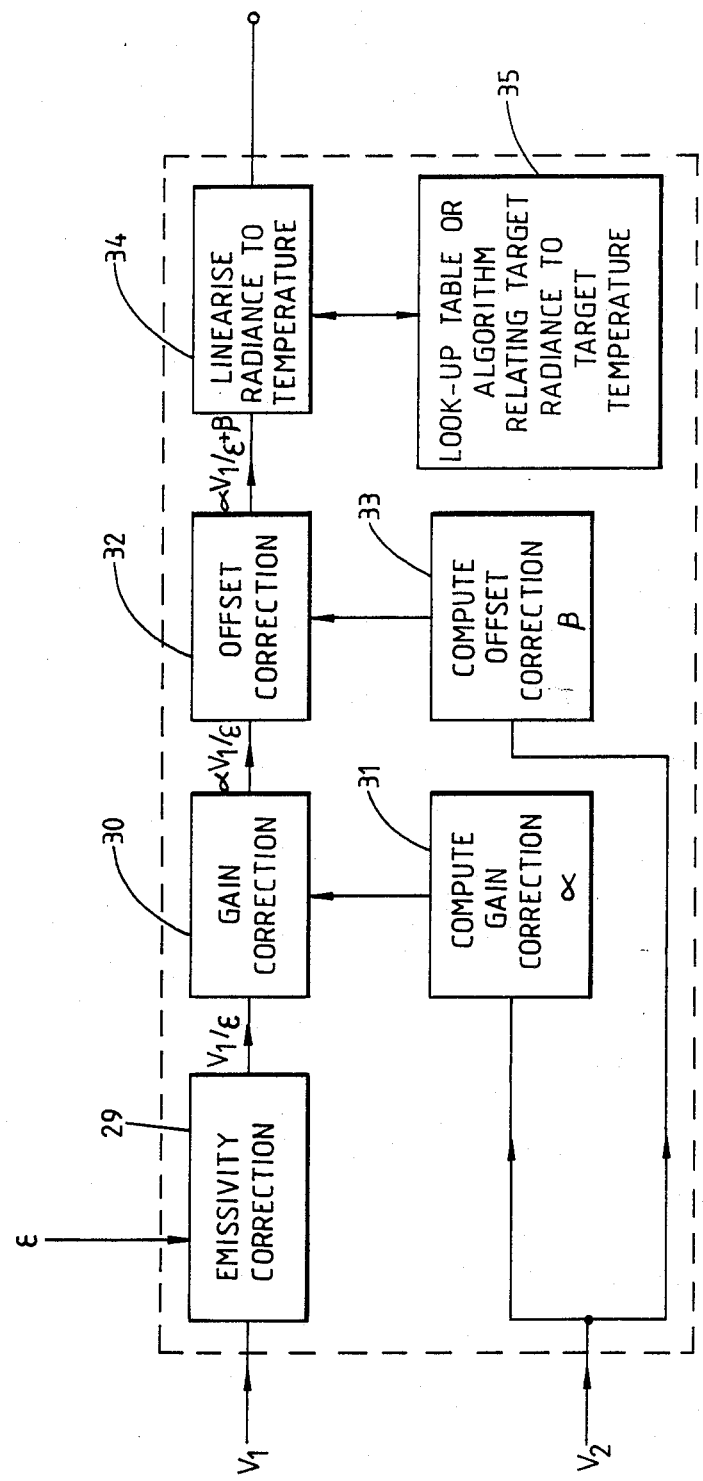
FIG. 6 is a block diagram of processing circuitry for connection to the receiver shown in FIG. 2.

These two output signals are then fed to processing circuitry which may comprise a microprocessor or, as shown in FIG. 6, a number of hardware components.

The target radiance signal $V_1$ is fed to an emissivity correction circuit 29 to which is also fed a predetermined emissivity value ($\epsilon$), the circuit multiplying the incoming signal by $1/\epsilon$ in order to compensate for target emissivity. This partially corrected signal $V_1/\epsilon$ is then fed to a gain correction circuit 30 which compensates the signal for gain drift due to the internal temperature of the thermometer. The compensation factor ($\alpha$) is computed in a circuit 31 to which the other signal (from the time averaging circuit 28) is fed.

The gain and emissivity corrected signal $\alpha V_1/\epsilon$ is fed to an offset correction circuit 32 which corrects the signal for offset drifts due to the temperature of the thermometer by adding a correction factor 8 computed in a circuit 33 to which the signal $V_2$ from the time averaging circuit 28 is also fed.

This finally corrected signal is fed to a linearising circuit 34 which computes the actual target temperature by reference to a look-up table 35 or by applying a predetermined algorithm) to the radiance representing temperature in accordance with Plancks law. The output signal from the lineariser 34 is a voltage which is a direct analogue of the target temperature (T). This can then either be displayed or stored, after digitisation, in a conventional manner.

Planck's Law is defined by the equation:

$$B(\lambda,T)\,d\lambda = \frac{C_1}{\lambda^5} \cdot \frac{1}{\exp[C_2/\lambda T] - 1}\,d\lambda$$

where $B(\lambda, T)\,d\lambda$ is the radiance within a wavelength band $d\lambda$ centered on $\lambda$; T is the target temp in °Kelvin; $C_1, C_2$ are constants.

The thermometer operates over a finite spectral bandpass $\lambda_1 < \lambda < \lambda_2$ with a variable transmission $\tau(\lambda)$ within the band. Hence the radiance detected is:

$$G \int_{\lambda_1}^{\lambda_2} \tau(\lambda)\,B(\lambda,T)\,d\lambda$$

where G is a constant geometrical factor.

I claim:

1. A radiation thermometer for use with a radiation monitoring system, said thermometer comprising a housing within which is mounted a radiation detector system including a radiation sensor positioned to receive radiation through a window in the housing, said sensor including electrical signal generating means for generating an electrical signal related to the temperature represented by the sensed radiation, an internal temperature detector for generating an electrical signal related to the temperature of the thermometer, an optical signal generator responsive to the electrical signals from the radiation sensor and the internal temperature detector, wherein the optical signal generator generates an alternating optical signal whose frequency is related to the electrical signal from the radiation sensor and whose mark-space ratio si related to the signal from the internal temperature detector, and wherein the housing has a portion, transparent to the optical signal, which is connectable in use with an optical waveguide for receiving and transmitting the optical signal to a monitoring system for determining the temperature of the sensed radiation from the optical signal received, and a power source connected to the detector system to constitute the sole source of power for the detector system.

2. The thermometer of claim 1, in which the housing is sealed against ingress of air and gases.

3. The thermometer of claim 1, wherein the radiation sensor generates an electrical output signal whose voltage varies with radiation intensity, and wherein the optical signal generator comprises a voltage to frequency converter for converting the voltage output signal from the radiation sensor to a signal having a frequency related to the voltage of the signal from the radiation sensor.

4. The thermometer of claim 1, wherein the optical signal generator includes a comparator having input ports to which are fed respectively the electrical signals from the radiation sensor and the internal temperature detector and from whose output is generated the alternating optical signal.

5. A radiation monitoring system comprising a radiation thermometer having a housing within which is mounted a radiation detector system including a radiation sensor positioned to receive radiation from a target through a window in the housing, said sensor including an electrical signal generating means for generating an electrical signal related to the temperature represented by the sensed radiation, an internal temperature detector for generating an electrical signal related to the temperature of the thermometer, an optical signal generator responsive to the electrical signals from the radiation sensor and the internal temperature detector, wherein the optical signal generator generates an alternating optical signal whose frequency is related to the electrical signal from the radiation sensor and whose mark-space ratio is related to the signal from the internal temperature detector, and a power source connected to the detector system to constitute the sole source of power for the detector system; and optical waveguide coupled at one end to a portion of the radiation thermometer housing transparent to the optical signal for receiving and transmitting the optical signal from the radiation thermometer; and a receiver coupled to the other end of the optical waveguide, the receiver including detection means for detecting the incoming optical signal and for generating a corresponding electrical signal, and processing means for determining from the electrical signal the temperature of the radiation sensed by the radiation sensor of the thermometer.

* * * * *